Figure 1:
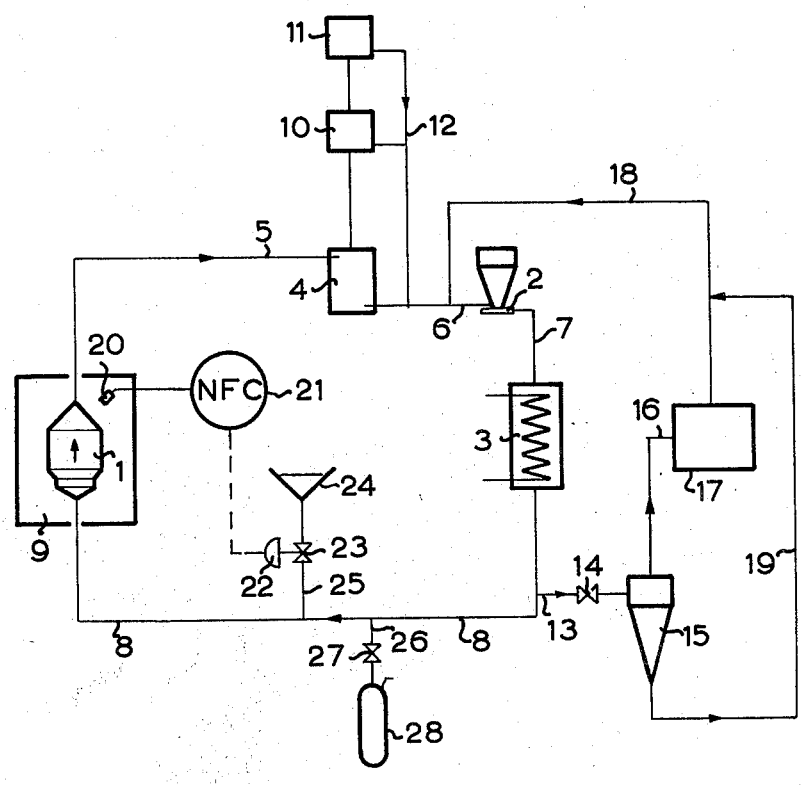

3,184,389
FINE CONTROL OF A SUSPENSION NUCLEAR REACTOR

Johannes A. H. Kersten, Arnhem, Netherlands, assignor to Stichting Reactor Centrum Nederland, The Hague, Netherlands
Filed Dec. 28, 1961, Ser. No. 162,818
Claims priority, application Netherlands, Dec. 30, 1960, 259,633
4 Claims. (Cl. 176—20)

The present invention relates to a method for the fine control of the power level of a suspension nuclear reactor at constant power demand.

By suspension nuclear reactor is understood here a nuclear reactor, adapted for the establishment of a self-sustaining neutron chain nuclear fission reaction in a system in which the nuclear fuel consists of a suspension of solid fissile material particles such as uranium oxide, whether or not in combination with fertile material particles such as thorium oxide, in ordinary or heavy water, which suspension continuously circulates in a primary suspension circuit through the nuclear reactor in which critical conditions prevail and through an external secondary circulation system including a heat exchanger, in which latter system non-critical conditions prevail.

As is well-known, at constant power demand, a nuclear reactor of the above-mentioned type is intrinsically self-regulating owing to the negative temperature coefficient of the moderating power of the ordinary or heavy water used as the carrier liquid for the nuclear fuel suspension.

This implies that for the coarse control of the power level of the nuclear reactor no special measures such as the application of control rods need be taken.

Apart from this, it has appeared in practice that abnormal fluctuations of the power level may occur which although of small magnitude and not causing dangerous excursions of the reactor, are by preference to be avoided as they are accompanied by variations in the temperature and the pressure of the circulating suspension which variations are less desirable in themselves and affect the reliability of the reactor and the lifetime of the apparatus adversely.

Said abnormal fluctuations of the power level substantially differ from the normal statistic fluctuations (noise), in that their frequency is lower and their amplitude is greater.

It is the main object of the present invention to provide a method for the fine control of the power level of a nuclear reactor of the suspension type by which method the said abnormal power level fluctuation may be suppressed.

It is a further object of the invention to provide for a simple automatic fine control method of a suspension nuclear reactor.

A still further object of the invention is the provision of a nuclear residue assembly adapted for automatic fine control of the power level.

Further objects and the entire scope of applicability of the invention will become apparent from the detailed description and example given hereinafter, in the annexed drawings and in the appertaining claims. It should be understood, however, that the detailed description and annexes are given by way of illustration and not of limitation.

According to the invention, should there occur abnormal fluctuations of the power level, a soluble electrolyte which affects the hydrogen, or the deuterium ion concentration, is added either automatically or non-automatically to the circulating suspension until the said abnormal fluctuations have disappeared.

If, for example, a suspension of uranium oxide in ordinary or heavy water is used as the nuclear fuel, the addition of a rather small quantity of an aqueous solution of a base, e.g., sodium hydroxide or ammonia, readily suppresses the abnormal fluctuations of the power level of the reactor.

The continuous or discontinuous measurement of the fluctuations of the power level necessary for the application of the invention, can be carried out in any suitable manner. However, the addition of the electrolyte is by preference controlled, whether or not automatically, in dependence on abnormal fluctuations of the neutron flux which fluctuations have shown to correlate with the abnormal power level fluctuations.

A suspension nuclear reactor assembly adapted for the application of the method according to the invention is characterized, for example, by the presence of a continuously operating neutron flux meter and of a differential amplitude controller with a low pass frequency band width limit, which controller is coupled to the above-mentioned meter and operatively connected to an automatic control valve in a conduit which connects a storage tank for liquid to the space for the circulating suspension.

In use, the said storage tank should contain a solution of the electrolyte that has shown to be useful for suppression of the abnormal power level fluctuations with the particular nuclear fuel utilized in the reactor.

The control apparatus is so adjusted that the said control valve is opened when the neutron flux fluctuations are abnormal and closed when the neutron flux fluctuations correspond again to the normal noise.

The invention will be further explained with reference to the drawings, in which FIGURE 1 shows a diagram of a homogeneous suspension nuclear reactor assembly adapted for realizing the method according to the invention.

Figure 2:
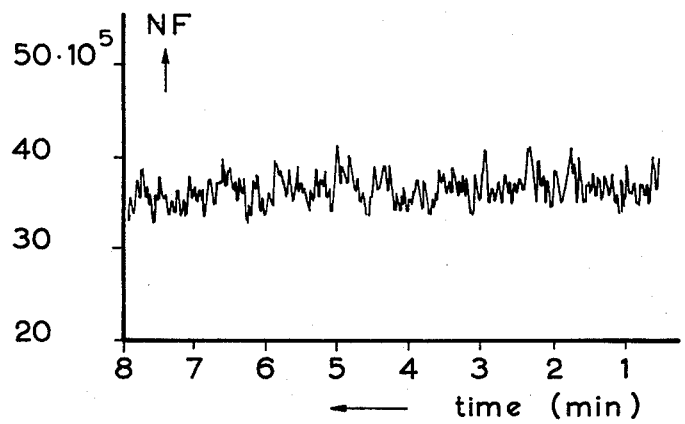
Figure 3:
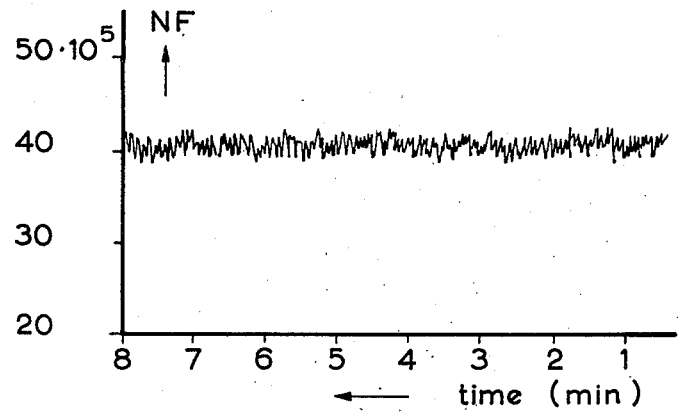

In FIGURES 2 and 3, graphs are given of the neutron flux fluctuations versus time in a practical case to be elucidated in the example hereinafter.

In FIGURE 1, the installation comprises a reactor vessel 1 and the connecting primary circuit for the nuclear fuel suspension consisting of a pump 2, a heat-exchanger 3, a gas separator 4, and connection pipes 5, 6, 7, and 8. The reactor vessel 1 is surrounded by the neutron reflector 9 consisting, for instance, of a pile of graphite blocks.

The suspension, heated up as a result of the nuclear fission reaction, delivers heat to a cooling medium in the heat exchanger 3, and the energy generated in this way can be further utilized in a power generating plant (not shown in the drawing).

In the gas separator 4, the gaseous radiolysis products of the common or heavy water used as the carrier liquid are separated from the circulating suspension and via a liquid trap 10 passed on to a catalytic cell 11, where they are recombining to ordinary or heavy water which water is condensated in an adjoining condenser and, via pipe 12, fed back to the conduit 6 in the primary suspension circuit together with the water separated in the liquid separator 10.

To free the carrier liquid of the circulating nuclear fuel suspension of fission products detained therein, part of the suspension is fed, whether or not continuously, through a conduit 13 provided with a control valve to a hydrocyclone 15. The overflow fraction from this hydrocyclone, which consists substantially of carrier liquid, flows through conduit 16 to a purifying station 17 where the fission products are removed. After that the carrier liquid freed from fission products flows back through conduit 18 to the primary suspension circuit together with the underflow fraction from the hydrocyclone 15, which consists of carrier liquid and practically all the fissile material of the suspension introduced into the hydrocyclone 15, which fraction flows back to the primary suspension circuit through the conduits 19 and 18.

Within the framework of the invention a continuously operating neutron flux meter 20, preferably, of the boron fluoride type, is mounted in the vicinity of the reactor vessel 1. A differential amplitude controller 21 having a low pass frequency band width limit converts the abnormal fluctuations of the neutron flux measured by said meter into control impulses, which are fed to a servo-motor 22 of a control valve 23 controlling the supply of an electrolyte solution form storage tank 24 via conduit 25 to conduit 8 of the primary suspension circuit.

In case of emergency the inventory of the suspension circuits can be quickly discharged into the tank 28 via conduit 26 by opening control valve 27. This tank is designed to such dimensions that if it is filled with nuclear fuel suspension, no critical conditions for a self-sustaining neutron chain fission reaction prevail therein.

*Example*

In a nuclear reactor assembly as shown in FIGURE 1 of the drawings, a suspension of uranium dioxide in common water consisting of spherical grains having a mean diameter of 10 micron, was continuously circulated.

The conditions prevailing within the reactor vessel 1 were of such a nature that the concentration of the suspension was 193 grams of uranium dioxide per liter in any place, a self-sustaining nuclear fission reaction occurred, and the power demand was constant.

On a given moment, the measuring impulses of the neutron flux meter 20 revealed abnormal fluctuations as schematically depicted in the graph according to FIGURE 2, in which the neutron flux is plotted along the ordinate, while the time in minutes is plotted along the abscissa. These abnormal neutron flux variations were a token of simultaneously occurring abnormal power level fluctuations.

After automatic addition of a quantity of a 0.1 normal aqueous solution of sodium hydroxide amounting to 0.3 cubic centimeter per liter of circulating nuclear fuel suspension, the neutron flux fluctuations showed the pattern according to the graph shown in FIGURE 3, which fluctuations correspond to the normal noise formerly detected, and are not transferable by further sodium hydroxide addition.

This neutron flux pattern corresponding to the common noise and signalizing the absence of unwanted abnormal power level fluctuations persisted normally for many hours at least. Newly occurring abnormal fluctuations could be suppressed in the same way.

What I claim is:

1. A method for the fine control of the power level of a nuclear reactor, in which reactor a process is established for a self-sustaining neutron chain nuclear fission reaction, the said reactor being a part of a system, said system comprising a nuclear fuel suspension of solid fissile material particles in water and a reactor assembly, said reactor assembly comprising a reactor-circuit and control apparatus, said reactor-circuit comprising the said nuclear reactor wherein critical conditions prevail and an external circuit including a heat-exchanger, wherein non-critical conditions prevail, the said nuclear fuel suspension circulating through said reactor-circuit, the improvement comprising gradually adding to the said circulating fuel suspension a small quantity of an aqueous solution of a base selected from the group consisting of sodium hydroxide and ammonia in an amount of 0.3 cc. of a 0.1 normal solution of the base per liter of circulating nuclear fuel suspension, said addition beginning as soon as abnormal fluctuations of the power level are measured, and ending as soon as the said abnormal fluctuation measurements have disappeared.

2. A nuclear reactor assembly, comprising a nuclear reactor constructed as a pressure vessel, having inlet and outlet for passing through the reactor a continuous stream of a suspension of solid fissile material in a liquid, the said pressure vessel surrounded by a neutron reflector and being of such a shape, that critical conditions therein will prevail if the said pressure vessel is completely filled with the said suspension of solid fissible material, an external circuit including a heat exchanger, wherein non-critical conditions prevail, the said external circuit connected to the inlet and outlet of the said pressure vessel of the nuclear reactor, a pump mounted in the said external circuit for the circulation of the said suspension through reactor and external circuit, a continuously operating neutron flux meter, situated within the measurable flux field of the reactor, a differential amplitude controller with a low pass frequency band width limit, which is coupled to the said meter and which is operatively connected to an automatic control valve in a conduit which connects a storage tank for electrolyte to the space for the circulating suspension.

3. A nuclear reactor assembly according to claim 2 wherein the said neutron flux meter is fixed to the structure of the said nuclear reactor pressure vessel.

4. A nuclear reactor assembly according to claim 2 wherein the said neutron flux meter is situated within the said neutron reflector.

References Cited by the Examiner

UNITED STATES PATENTS

| | | | |
|---|---|---|---|
| 3,046,212 | 7/62 | Anderson | 176—45 |
| 3,054,738 | 9/62 | Hermans et al. | 176—37 |

OTHER REFERENCES

Nucleonics, May 1958, vol. 16, No. 5, pp. 80–81.

CARL D. QUARFORTH, *Primary Examiner.*

RUBEN EPSTEIN, *Examiner.*